United States Patent Office 3,256,194
Patented June 14, 1966

3,256,194
HALOALKYLENE REACTION PRODUCTS
James M. Petersen, Fishkill, and David D. Reed, Glenham, N.Y., and Herman D. Kluge, deceased, late of Fishkill, N.Y., by Hazel E. Kluge, administratrix, Fishkill, N.Y., assignors to Texaco Inc., New York, N.Y., a corporation of Delaware
No Drawing. Filed Oct. 18, 1962, Ser. No. 232,659
10 Claims. (Cl. 252—46.7)

This invention pertains to novel reaction products of halogenated alkylene oxides and hydrocarbonthiophosphonic acids. More particularly, it relates to halohydroxyalkyl hydrocarbonthiophosphonates and their method of manufacture. In addition the invention pertains to lubricant compositions containing said thiophosphonates.

Alkaline earth metal salts of hydrocarbonthiophosphonic acids obtained by hydrolysis of phosphorus pentasulfide ($P_2S_5$)-hydrocarbon reaction products are widely used in lubricants as detergent and dispersant additives. The novel haloalkylene oxide-hydrocarbonthiophosphonic acid reaction products contemplated herein have been found to have excellent properties as detergent-dispersant additives for lubricating oil and fuel.

The halohydroxyalkyl hydrocarbonthiophosphonates of the instant invention are represented by the following formula:

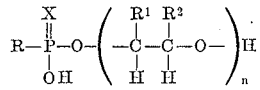

wherein R is a hydrocarbyl radical, X is sulfur or a mixture of sulfur and oxygen, $n$ is an average value from 1 to 2 inclusively, and $R^1$ and $R^2$ are hydrogen, alkyl of 1 to 6 carbons, or a halogen substituted alkyl radical of 1 to 6 carbons, at least one of said $R^1$ and $R^2$ radicals being haloalkyl.

Broadly the novel compounds of the invention are prepared by reacting a haloalkylene oxide under particular temperature and quantity conditions with a hydrocarbonthiophosphonic acid in the absence of catalyst to form halohydroxyalkyl hydrocarbonthiophosphonates described by the above formula.

*Preparation of the hydrocarbonthiophosphonic acid reactant*

The thiophosphonic acid is derived from a $P_2S_5$ (phosphorus pentasulfide)-hydrocarbon reaction product. The $P_2S_5$-hydrocarbon product is prepared by the reaction of aromatic hydrocarbons, cycloaliphatic hydrocarbons and aliphatic hydrocarbons with $P_2S_5$ at elevated temperatures. Although a wide variety of hydrocarbons such as arakenes are usable as the hydrocarbon reactant, olefins are the preferred hydrocarbon reactant. Lubricating oil fractions comprise another desirable class of materials for reaction with $P_2S_5$ to form a product which after further treatment as outlined below is converted to halohydroxyalkyl hydrocarbonthiophosphonates.

The olefinic hydrocarbons reacted with $P_2S_5$ advantageously contain at least 12 carbon atoms although lower molecular weight olefins can be employed. Many olefin polymers such as polyisobutylene, polybutylene, polypropylene and copolymers of olefins such as propyleneisobutylene copolymer are preferred materials for reaction with $P_2S_5$. Generally, olefin polymer and copolymers having an average molecular weight between about 250 and 50,000 are employed. Polymers and copolymers having an average molecular weight range from about 600 to 5,000 are particularly preferred. Copolymers of conjugated dienes and olefins such as a copolymer of butadiene and isobutylene having an average molecular weight above 50,000 also react with $P_5S_5$. One preferred olefin polymer is polybutene of an average molecular weight between 600 and 5,000. Olefins used for reaction with $P_2S_5$ are also prepared by halogenation of high molecular weight hydrocarbon fractions and subsequent dehydrohalogenation. Olefin fractions obtained by cracking of higher molecular weight hydrocarbons may also be used as the hydrocarbon reactant.

In the preparation of the hydrocarbonthiophosphonic acid, a reaction mixture of $P_2S_5$ and hydrocarbon comprising 5–40 wt. percent $P_2S_5$ is heated at a temperature between about 100–320° C. in a non-oxidizing atmosphere, for example, under a blanket of nitrogen. The resultant product is hydrolyzed at a temperature between about 100 and 260° C. by contacting with steam. The steam treatment converts the hydrocarbon-$P_2S_5$ reaction product to a hydrocarbonthiophosphonic and inorganic phosphorus acids. The hydrocarbonthiophosphonic acid is of the general formula:

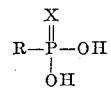

wherein R is the charged hydrocarbyl radical, e.g., of 20 to 200 carbon atoms and X is sulfur or a mixture of oxygen and sulfur. X in the above formula is designated sulfur or a mixture of sulfur and oxygen because the steam hydrolysis treatment often results in replacement of a portion of the sulfur joined to the phosphorus with oxygen.

The inorganic phosphorus acids formed during hydrolysis are removed prior to reaction with the haloalkylene oxide. A number of different procedures are available for the removal of inorganic phosphorus acids. In U.S. Patent Nos. 2,951,835 and 2,987,514, the removal of the inorganic phosphorus acids is effected by contacting with synthetic hydrous alkaline earth metal silicates and synthetic hydrous alkali metal silicates, respectively. In addition commonly-assigned copending application Serial No. 841,668, filed September 23, 1959 by H. D. Kluge and R. G. Lacoste, describes a process wherein inorganic phosphorus acids are removed from the hydrolyzed product by extraction with anhydrous methanol.

*Haloalkylene oxide reactant*

Haloalkylene oxides which react with hydrocarbonthiophosphonic acids in the absence of catalyst to form the novel halohydroxylakyl hydrocarbonthiophosphonates of the subject invention are represented by the general formula:

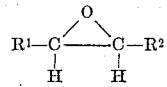

wherein $R^1$ and $R^2$ are selected from the group consisting of hydrogen, alkyl and a halogen substituted alkyl radicals and where at least one of said $R^1$ and $R^2$ radicals is a halo-alkyl radical and the alkyl groups being from 1 to 6 carbons. By haloalkyl we intend an alkyl radical having from one to all (perhalo) of the hydrogens of the alkyl substituted with halogens such as fluorine, chlorine, bromine, and iodine. Examples of the haloalkylene oxides contemplated herein are 1-chloro-2,3-epoxypropane (epichlorohydrin), 1,2 difluoro-2, 3-epoxybutane, 1,2,5,6 tetrabromo-2,3-epoxyhexane and 1-bromo-2,3-epoxypropane (epibromohydrin).

*Preparation of the thiophosphonates of the invention*

The reaction can be broadly described by the following equations:

A.
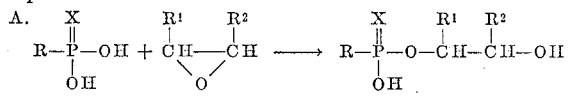

B.
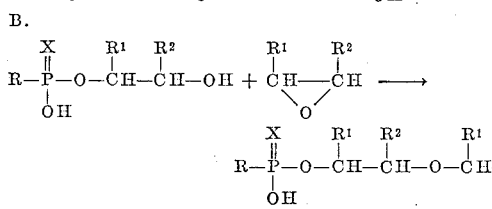

$R$, $R^1$, $R^2$ and $X$ are as heretofore defined. The reaction designated by Equation A predominates, however, often at least a minor part of the thiophosphonate formed in Equation A reacts with additional haloalkylene oxide in the manner described in Equation B. Therefore, in the generic formula describing the thiophosphates of the invention $n$ is defined as an average value from 1 to 2 inclusively. Fractional values for $n$ between 1 and 2 are average values denoting a mixture of the thiophosphonate of Equation A and the thiophosphonate of Equation B.

More specifically, the reaction of the haloalkylene oxides with hydrocarbonthiophosphonic acid to produce the halohydroxyalkyl hydrocarbonthiophosphonates is effected at a temperature between about 25 and 175° C. with temperatures of between about 75 and 125° C. being preferred. At temperatures below about 25° C. the rate of reaction is extremely slow. At temperatures above about 175° C. there is considerable thermal decomposition of the thiophosphonate product. At temperatures between about 75 and 125° C. the thermal decomposition appears insignificant and the reaction is sufficient enough to give a rapid yet controllable reaction. In addition to the foregoing the oxide and acid are reacted in a mole ratio of between about 0.7:1 and 2.5:1, preferably between about 1:1 and 2:1. When mole ratios of less than about 0.7:1 are employed the reaction tends to be incomplete in that a significant amount of unreacted hydrocarbonthiophosphonic acid remains present. At ratios above about 2.5:1 the excess oxide is unnecessary.

Excess olefin oxide is removed after completion of the reaction by standard means, e.g., by blowing the reaction mixture at an elevated temperature under reduced pressure (e.g., 100 to 125° C. under 10–15 mm. Hg pressure) with an inert gas such as nitrogen.

*Lubricant compositions containing the novel halohydroxyalkyl hydrocarbonthiophosphonates*

The hydrocarbon mineral oils usable in the thiophosphonate lubricant composition of the invention can be paraffin base, naphthene base or mixed paraffin-naphthene based distillate or residual oils. Paraffin base distillate lubricating oil fractions are used in the formulation of premium grade motor oil such as are contemplated in this invention. The lubricating base generally has been subjected to solvent refining to improve its lubricity and viscosity-temperature relationship as well as solvent dewaxing to remove waxy components and improve the pour of the oil. Broadly speaking, mineral lubricating oils having an SUS viscosity at 100° F. between 50 and 1,000 may be used in the formulation of the improved lubricants of this invention but usually the viscosity range falls between 70 and 300 at 100° F.

The mineral lubricating oils containing halohydroxyalkyl esters of hydrocarbonthiophosphonic acids may also contain other additives designed to impart other desirable properties thereto. For example, V.I. improvers such as the polymethacrylates are normally included therein as are corrosion inhibitors and other detergents.

A widely used V.I. improver is a polymethacrylate having the general formula:

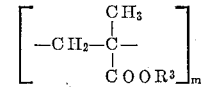

wherein $R^3$ is an aliphatic radical of from 1 to 20 carbons and $m$ is an integer between 600 and 35,000.

The most commonly used supplementary detergent is an alkaline earth metal alkylphenolate. Barium nonylphenolate, barium dodecylcresolate and calcium dodecylphenolate are examples of such detergents. These products which are well known detergent additives are usually present in the lubricating oil in a concentration between 0.1 and 5 wt. percent.

The most commonly used inhibitor and antioxidant is a divalent metal dialkyl dithiophosphate resulting from a neutralization of a $P_2S_5$-alcohol reaction product with a divalent metal or divalent metal oxide. Barium and zinc dialkyl dithiophosphate are the most widely used oxidation and corrosion inhibitors. Metal dialkyl dithiophosphates are usually present in the lubricant in a concentration between 0.1 and 3 wt. percent.

Synthetic lubricating bases of the ester or ether type may also be used as the lubricating oil. High molecular weight, high boiling liquid aliphatic dicarboxylic acid ester possess excellent viscosity-temperature relationships and lubricating properties and are finding ever-increasing utilization in lubricataing oils adapted for high and low temperature lubrication. Esters of this type are used in the formulation of jet engine oils.

The halohydroxyalkyl hydrocarbonthiophosphonates are present in lubricating oils in concentrations sufficient to impart dispersant properties thereto. In concentrates used in the formulation of finished lubricants, the concentration of halohydroxyalkyl hydrocarbonthiophosphonate can be as high as 50%. In finished lubricants, the concentration of the additive falls between 0.2 and 10 wt. percent with a concentration between 1 and 5 wt. percent normally being employed.

Examples of halohydroxyalkyl hydrocarbonthiophosphonates of the invention effective as lubricating oil dispersants are illustrated by the following: 3-chloro-2-hydroxypropyl polybutene(780 M.W.) thiophosphonate, 3-chloro-2-hydroxypropyl polybutene(940 M.W.)thiophosphonate, 1 - fluoromethyl-2-hydroxy-3-fluoropropyl polybutene(1200 M.W)thiophosphonate, 1 - (1',2' - dibromoethyl)-2-hydroxy-3-bromopropyl polybutene(1200 M.W.) thiophosphonate, 3-bromo-2-hydroxypropyl polymethylene(2500 M.W.)thiophosphonate, and 2-chloromethyl-3-oxa-5-hydroxy-6-chlorohexyl polybutene(940 M.W.)thiophosphonate.

Example I below illustrates the preparation of hydrocarbonthiophosphonic acid. Examples II and III show the preparation of halohydroxyalkyl hydrocarbonthiophosphonates from the thiophosphonic acid of Example I. Examples IV and V demonstrate the effectiveness of the thiophosphonates as additives in lubricating oils.

EXAMPLE I

A polybutene-$P_2S_5$ reaction product was prepared by reacting polybutene having an average molecular weight of about 940 with $P_2S_5$ in a mole ratio of polybutene to $P_2S_5$ of 1:1 and in the presence of sulfur in an amount equal to 1.3 wt. percent of the polybutene. The reaction mixture was maintained at 232° C. until said mixture was soluble in n-pentane. The reaction product was then diluted with 150 wt. percent naphthene oil base having an SUS viscosity at 100° F. of 100, steamed at 176° C. for ten hours in a nitrogen atmosphere and then dried by passage of nitrogen therethrough at 176° C. The hydrolyzed product was extracted with 50% by volume of methyl alcohol at 60° C. to give a methanol extract containing inorganic phosphorus acids and a lubricating oil raffinate containing polybutene(940 M.W.)thiophosphonic acid of the formula:

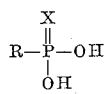

which after being stripped free of methanol had a Neut. No. of 23.1. Analysis found the sulfur content to be 0.51 wt. percent. The theoretical sulfur content in

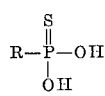

is 1.29 indicating a product where X is a mixture of sulfur and oxygen.

EXAMPLE II

A polybutene of an average molecular weight of 940 was reacted with $P_2S_5$ in the manner described in Example I to form a polybutenethiophosphonic acid having a neutralization number (Neut. No.) of 20. One half mole (1400 grams), based on Neut. No., of the polybutenethiophosphonic acid was charged to a 5 liter, 3-necked flask equipped with a stirrer, a dropping funnel, a gas inlet tube extending below the surface of the acid reactant, a thermometer and a reflex condenser. The olefin-$P_2S_5$ acid was heated to 93° C. (200° F.) over a 0.5 hour period with stirring and nitrogen blowing at approximately 1 liter per minute. While the temperature in the flask was maintained at 93° C. and the nitrogen flow rate was reduced to 5–10 mls./min. One mole (95 grams) of 1-chloro-2,3-epoxypropane was added dropwise to the reaction flask. At the end of the epichlorohydrin addition period the mixture was maintained at 93° C. for an added two hour period. At the end of the reaction period the epoxypropane remaining in the reaction flask was stripped therefrom by passing nitrogen through the reaction mixture maintained at 100° C. and under reduced pressure (10–15 mm. Hg) utilizing a water aspirator. On cooling there was attained a stripped reaction product which was shown by analysis to consist primarily of a mixture of three parts of mono-(2-hydroxy-3-chloropropyl) polybutenethiophosphonate and two parts of mono-(2-chloromethyl-3-oxa-5-hydroxy-6-chlorohexyl) polybutenethiophosphonate of the following formula:

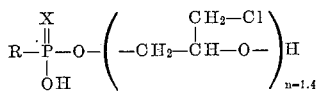

wherein R is a polybutene radical of 940 average molecular weight and X is a mixture of sulfur and oxygen. This product analyzed as follows:

| Description | Calculated | Found |
|---|---|---|
| Chlorine, Wt. percent | 1.70 | 1.49 |
| Hydroxyl No. | 19.4 | 20 |
| Phosphorus, Wt. percent | 1.04 | 0.85 |
| Neut. No. | 0 | 2.8 |
| Oxide/thiophosphonic acid, mole ratio in product | 1.4 | 1.4 |

EXAMPLE III 1,315 grams (0.5 mole based on Neut. No.) of polybutene(940 M.W.)thiophosphonic acid of the type prepared in Example I having a Neut. No. of 21.4 was reacted with 46 grams (0.5 mole) of epichlorohydrin in a procedure similar to that of Example II except the reaction was maintained after the epichlorohydrin addition for 3 hours at 177° C. (350° F.). After the 3 hour period 46 more grams of epichlorohydrin was added and heating continued for an additional 4 hours. The reaction mixture was then stripped at 100° C. at 10–15 mm. Hg pressure utilizing a water aspirator. The residual product was identified as primarily mono-(2-hydroxy-3-chloropropyl) polybutene(940 M.W.)thiophosphonate of the formula:

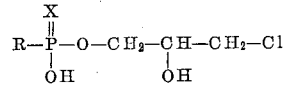

The product analyzed as follows:

| Description | Calculated | Found |
|---|---|---|
| Chlorine, Wt. percent | 1.31 | 1.37 |
| Hydroxyl No. | 20.6 | 25 |
| Phorhorus, Wt. percent | 1.11 | 1.11 |
| Neut. No. | 0 | 9.1 |

EXAMPLE IV

This example illustrates the thermal stability of the halohydroxyalkyl hydrocarbonthiophosphonates of the invention. Thermal stability is indicative of suitability as lubricant additive.

The thermal stability is determined by measuring the degree of change in Hydroxyl No. and percent Chlorine of a substance when subjecting said substance to an elevated temperature utilizing a 0.25 liter/min. nitrogen sweep. The greater the degree of change the less thermally stable.

500 grams of 2-hydroxy-3-chloropropyl polybutene (940 M.W.)thiophosphonate designated as "A" was heated in a liter flask at 150° C. (300° F.) for 9 hours while maintaining in an atmosphere of nitrogen. For comparison the test was again repeated utilizing 2-hydroxyethyl polybutene(940 M.W.)thiophosphonate designated as "B." Their results are reported below:

| Description | A | | B | |
|---|---|---|---|---|
| | Before Heating | After Heat., 9 Hrs. | Before Heating | After Heat., 9 Hrs. |
| Hydroxyl No. | 24 | 16 | 17 | 10 |
| Chlorine, Wt. Percent | 1.52 | 1.11 | | |
| Neut. No. | 1.90 | 8.1 | 0.7 | 4.5 |

It is to be noted from the above that the product of the invention deteriorates essentially on the same order as 2-hydroxyethyl polybutenethiophosphonate compound, the latter being the subject of co-assigned application Serial No. 59,505, filed September 30, 1960 wherein the excellent lubricant additive properties for the 2-hydroxyethyl polybutenethiophosphonate are described.

EXAMPLE V

This example illustrates the lubricant compositions of the invention and the outstanding lubricant additive properties of the thiophosphonates of the invention utilizing the well known CLR Engine Sludge Test.

A description of an SAE 10W–30 motor oil containing 2-hydroxy-3-chloropropyl polybutene(940 M.W.) thiophosphonate and CLR test results are reported below:

Description:            Concentration
    Refined Paraffinic Distillate Oil _____ 89.57
    2 - hydroxy - 3 - chloropropyl polybutene(940
        M.W.)thiophosphonate _____ 4.10
    Barium $C_{12}$alkylphenolate _____ 1.72
    Zinc isopropyl 1,3-dimethylbutyl dithiophosphate _____ 0.61
    Mineral oil concentrate containing 25 wt. percent of a copolymer of mixed methacrylate alkyl esters in which the alkyl groups range from butyl to octadecyl _____ 4.00
    Dimethylsilicone anti-foam concentrate, p.p.m. _____ 150

CLR SLUDGE TEST

| Hours | 54 | 70 | 94 | 110 |
|---|---|---|---|---|
| Sludge Rating | 9.8 | 9.3 | 6.4 | 6.0 |

10 = clean oil.

A blank was run in the CLR test which was identical to the above described lubricant composition except the 2-hydroxy-3-chloropropyl polybutenethiophosphonate was deleted therefrom. After 54 hours the sludge rating for the blank was 5.4 which is lower than the rating of the thiophosphonate containing lube after 110 hours indicating the outstanding dispersing property of the thiophosphonate.

We claim:
1. A product selected from the group consisting of halohydroxyalkyl hydrocarbonthiophosphonate and a mixture of said halohydroxyalkyl hydrocarbonthiophosphonate and corresponding halohydroxyalkyl hydrocarbonphosphonate, said halohydroxyalkyl hydrocarbonthiophosphonate having the formula:

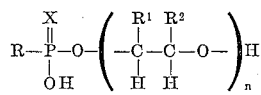

where X is sulfur, $n$ is a value from 1 to 2, R is a hydrocarbyl derived from a polyolefin having an average molecular weight between about 250 and 50,000 and $R^1$ and $R^2$ are selected from the group consisting of hydrogen, alkyl of from 1 to 6 carbon atoms and a halogen substituted alkyl from 1 to 6 carbon atoms, at least one of said $R^1$ and $R^2$ radicals being said halogen substituted alkyl radical, said mixture consisting of a major amount of said hydrocarbonthiophosphonate and a minor amount of said corresponding hydrocarbonphosphonate where X is oxygen.

2. A product in accordance with claim 1 wherein said product is said mixture and said hydrocarbonthiophosphonate is 2-hydroxy-3-chloropropyl hydrocarbonthiophosphonate of the formula:

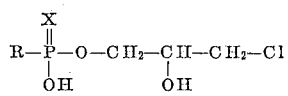

wherein R is a polyolefin having an average molecular weight between about 250 and 50,000.

3. A product in accordance with claim 2 wherein said R in said 2-hydroxy-3-chloropropyl hydrocarbonthiophosphonate is a polybutene radical having an average molecular weight of about 940.

4. A product in accordance with claim 1 wherein said product is said mixture and R is a polybutene radical having an average molecular weight of about 940, $R^1$ is hydrogen, $R^2$ is chloromethyl, and $n$ is 1.4.

5. A product in accordance with claim 1 wherein said product is said mixture and said hydrocarbonthiophosphonate is 2-chloromethyl-3-oxa-5-hydroxy-6-chlorohexyl hydrocarbonthiophosphonate of the formula:

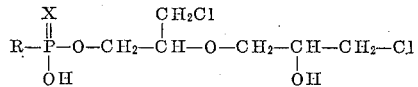

where R is a polybutene radical of an average molecular weight of 940.

6. A lubricating oil composition containing between 0.2 and 10 wt. percent of a component selected from the group consisting of halohydroxyalkyl hydrocarbonthiophosphonate and a mixture of said halohydroxyalkyl hydrocarbonthiophosphonate and corresponding halohydroxyalkyl hydrocarbonphosphonate, said halohydroxyalkyl hydrocarbonthiophosphonate having the formula:

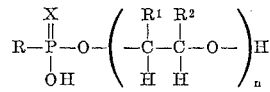

where X is sulfur, R is a hydrocarbyl radical derived from a polyolefin having a molecular weight between about 250 and 50,000, $n$ is a value from 1 to 2 inclusively, $R^1$ and $R^2$ are selected from the group consisting of hydrogen, alkyl of from 1 to 6 carbon atoms and a halogen substituted alkyl from 1 to 6 carbon atoms, at least one of said $R^1$ and $R^2$ radicals being said halogen substituted alkyl radical and said lubricating oil being a member selected from the group consisting of mineral lubricating oil, synthetic ester lubricating oil and synthetic ether lubricating oil, said mixture consisting of a major amount of said halohydroxyalkyl hydrocarbonthiophosphonate and a minor amount of said corresponding halohydroxyalkyl hydrocarbonphosphonate where X is oxygen.

7. A lubricating oil composition in accordance with claim 6 wherein said lubricating oil is a mineral lubricating oil having an SUS viscosity at 100° F. between 50 and 1,000.

8. A lubricating oil composition in accordance with claim 6 wherein said thiophosphonate is 2-hydroxy-3-chloropropyl polybutene(940 M.W.)thiophosphonate, said lubricating oil is a mineral lubricating oil having an SUS viscosity at 100° F. between 50 and 1,000.

9. A lubricating oil composition according to claim 6 wherein said thiophosphonate is 2-hydroxy-3-chloropropyl polybutene(940 M.W.)thiophosphonate, said lubricating oil is a mineral lubricating oil having an SUS viscosity at 100° F. between 50 and 1,000.

10. A lubricating oil composition according to claim 6 wherein said component is said mixture, R is a polybutene radical of an average molecular weight of about 940, $R^1$ is hydrogen, $R^2$ is chloromethyl, X is a mixture of sulfur and oxygen, and $n$ is 1.4, and said lubricating oil is a mineral lubricating oil having an SUS viscosity at 100° F. between 50 and 1,000.

References Cited by the Examiner

UNITED STATES PATENTS

| 2,652,426 | 9/1953 | Stayner | 260—461 |
| 2,914,478 | 11/1959 | Neff | 252—46.6 |
| 3,123,630 | 3/1964 | Oberender et al. | 252—46.6 |

FOREIGN PATENTS

| 792,553 | 3/1958 | Great Britain. |
| 838,928 | 6/1960 | Great Britain. |

DANIEL E. WYMAN, *Primary Examiner.*

L. G. XIARHOS, *Assistant Examiner.*